United States Patent
Froelich et al.

(10) Patent No.: US 7,689,362 B2
(45) Date of Patent: Mar. 30, 2010

(54) DETERMINING THE IMPEDANCE OF MATERIAL BEHIND A CASING IN A BOREHOLE

(75) Inventors: Benoît Froelich, Marly le Roi (FR); Emmanuel Legendre, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/574,905
(22) PCT Filed: Sep. 8, 2005
(86) PCT No.: PCT/EP2005/009845

§ 371 (c)(1),
(2), (4) Date: Jan. 3, 2008

(87) PCT Pub. No.: WO2006/029826

PCT Pub. Date: Mar. 23, 2006

(65) Prior Publication Data

US 2008/0189041 A1 Aug. 7, 2008

(30) Foreign Application Priority Data

Sep. 13, 2004 (EP) .................................. 04292183

(51) Int. Cl.
*G01V 1/48* (2006.01)
(52) U.S. Cl. .......................................... 702/6; 702/11
(58) Field of Classification Search .................... 702/9, 702/11, 13, 15
See application file for complete search history.

(56) References Cited

U.S. PATENT DOCUMENTS

| | | | | |
|---|---|---|---|---|
| 3,697,937 A | * | 10/1972 | Ingram | 367/25 |
| 3,739,328 A | * | 6/1973 | Beil | 367/25 |
| 3,747,702 A | * | 7/1973 | Beil | 367/87 |
| 4,255,798 A | * | 3/1981 | Havira | 367/35 |
| 4,928,269 A | * | 5/1990 | Kimball et al. | 367/35 |
| 5,146,432 A | * | 9/1992 | Kimball et al. | 367/13 |
| 5,216,638 A | * | 6/1993 | Wright | 367/35 |
| 5,274,604 A | | 12/1993 | D'Angelo et al. | |
| 5,784,333 A | | 7/1998 | Tang et al. | |
| 6,041,861 A | * | 3/2000 | Mandal et al. | 166/250.01 |

OTHER PUBLICATIONS

De Levie, R., Advanced Excel for Scientific Data Analysis, p. 300-301, Oxford University Press, UK (Aug. 2003).*

* cited by examiner

*Primary Examiner*—Hal D Wachsman
*Assistant Examiner*—Ronald L Biegel
(74) *Attorney, Agent, or Firm*—Darla P. Fonseca; Myron K. Stout (57) ABSTRACT

A method for estimating an impedance of a material behind a casing wall in a borehole, the method comprises exciting the casing wall with an acoustic pulse, and measuring by means of a transducer an experimental acoustic waveform (W) reflected from the casing wall. The method further comprises initializing an impedance parameter (Zin), computing an inverse casing response ($R_{cas}^{-1}$) as a function of the impedance parameter (Zin) and a casing thickness parameter ($Cas_{in}$), and deconvoluting the experimental acoustic waveform with the inverse casing response to obtain a transducer response (T). An iterative loop is performed, comprising the computing of an inverse casing response and the deconvoluting of the experimental acoustic waveform by varying the impedance parameter until the transducer response becomes compact in the time domain. The estimated impedance (Zcem) is obtained from the impedance parameter when the transducer response is compact.

5 Claims, 6 Drawing Sheets

DETERMINING THE IMPEDANCE OF MATERIAL BEHIND A CASING IN A BOREHOLE

BACKGROUND OF INVENTION

1. Field of the Invention

The invention relates generally to acoustical investigating of a borehole, and to the determining of an impedance of a material behind a casing located in a borehole

2. Background Art

Acoustical investigating is widely used to investigate casings found in boreholes. Typically acoustical investigating uses ultrasonic waves.

Boreholes penetrating an earth formation generally comprise a wall with an annular space filed with set cement. After the cement has set in the annular space of the casing it is common practice to use acoustic non-destructive testing methods to evaluate its integrity. This evaluation is of prime importance since the cement must guarantee zonal isolation between different formations in order to avoid flow of fluids from the formations (water, gas, oil) through the annular space of the casing.

Figure 1:
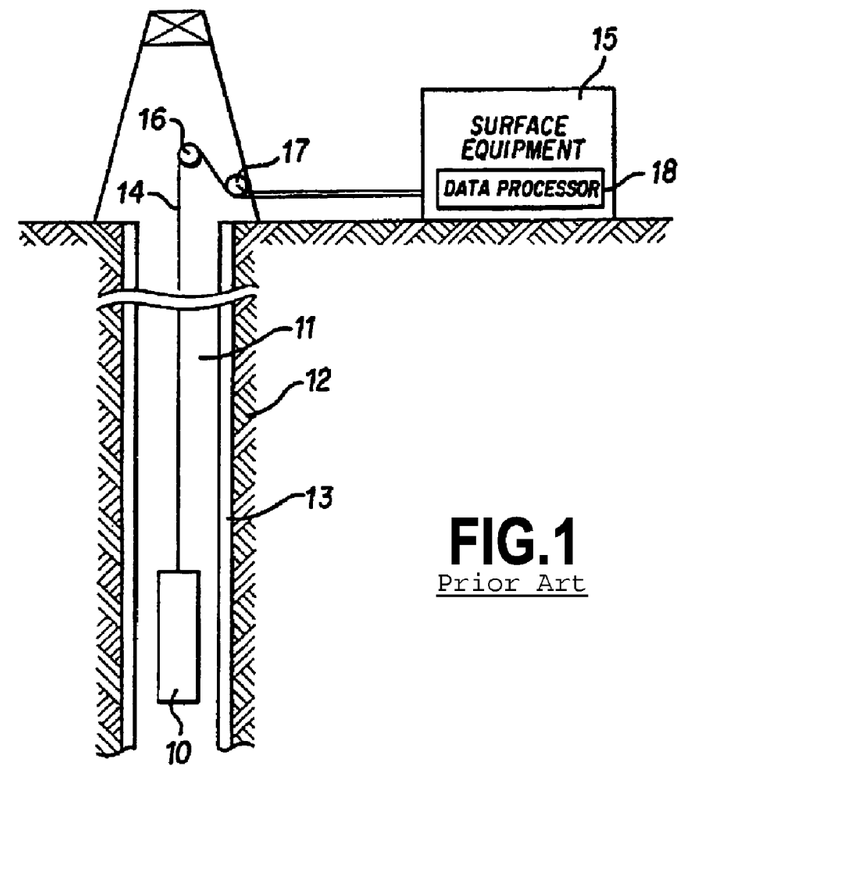
FIG. 1 shows an example of an acoustic logging set up.

Turning now to FIG. 1, a schematic diagram of a logging operation is shown. Tool, or sonde, 10 for evaluating cement quality is located in borehole 11 penetrating earth formation 12. Casing 13 is cemented to the walls of the borehole, as explained in detail with reference to FIG. 3, below. The sonde is preferably lowered in the borehole by armored multi-conductor cable 14 and slowly raised by surface equipment 15 over sheave wheel 16 while cement quality measurements are performed. The depth of the tool is measured by depth gauge 17, which measures cable displacement.

Sonde 10 measures cement quality by emitting an acoustic pulse and analyzing its return waveform. The sonde is capable of obtaining cement quality measurements azimuthally. The sonde measures cement quality by emitting acoustic excitation pulses and analyzing the return waveforms produced as a result of reflections from the casing, as well as reverberations of the casing. The return waveforms can be analyzed by the sonde in situ, analyzed by data processor 18 at the surface, or stored, either in the sonde or at the surface, for analysis at a remote location. In the preferred embodiment, the return waveform data is transferred to data processor 18 by cable 14, where the cement quality is determined.

The excitation pulse preferably excites a thickness resonance of the casing. As is known in the art, such resonance traps energy in the casing. The subsequent reduction of trapped energy in the casing may be considered the result of leakage attributable to the degree of acoustic coupling to adjacent media. All resonances excited by the excitation pulse trap energy in this manner.

It is possible to design a sonde having a plurality of transceivers, each of which generates excitation pulses which excite the fundamental resonant frequency for each of the plurality of different nominal casing thicknesses encountered. In a preferred embodiment, however, the sonde includes one transceiver having an excitation pulse which excites either the fundamental resonance, or a harmonic thereof, for the wide range of casing thicknesses typically encountered. The acoustic pulse is, therefore, preferably highly damped and of short duration on the order of eight microseconds or less. An example of frequency spectrum of the acoustic pulse, is shown with reference to FIG. 2, and has a 6-dB bandwidth of about 400 kHz centered at about 450 kHz.

Figure 2:
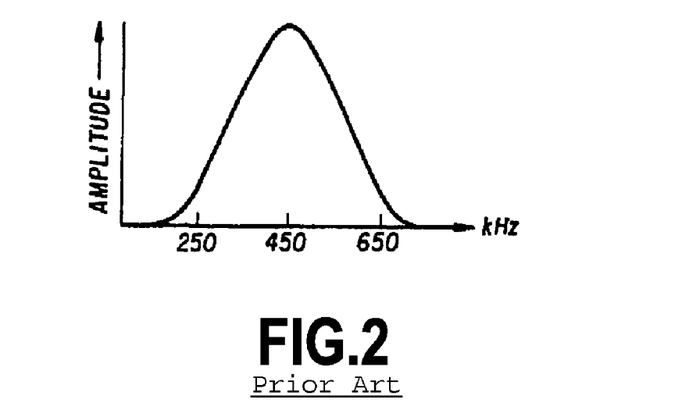
FIG. 2 shows a typical example of an acoustic frequency spectrum for a pulse used in acoustical investigation.
Figure 3:
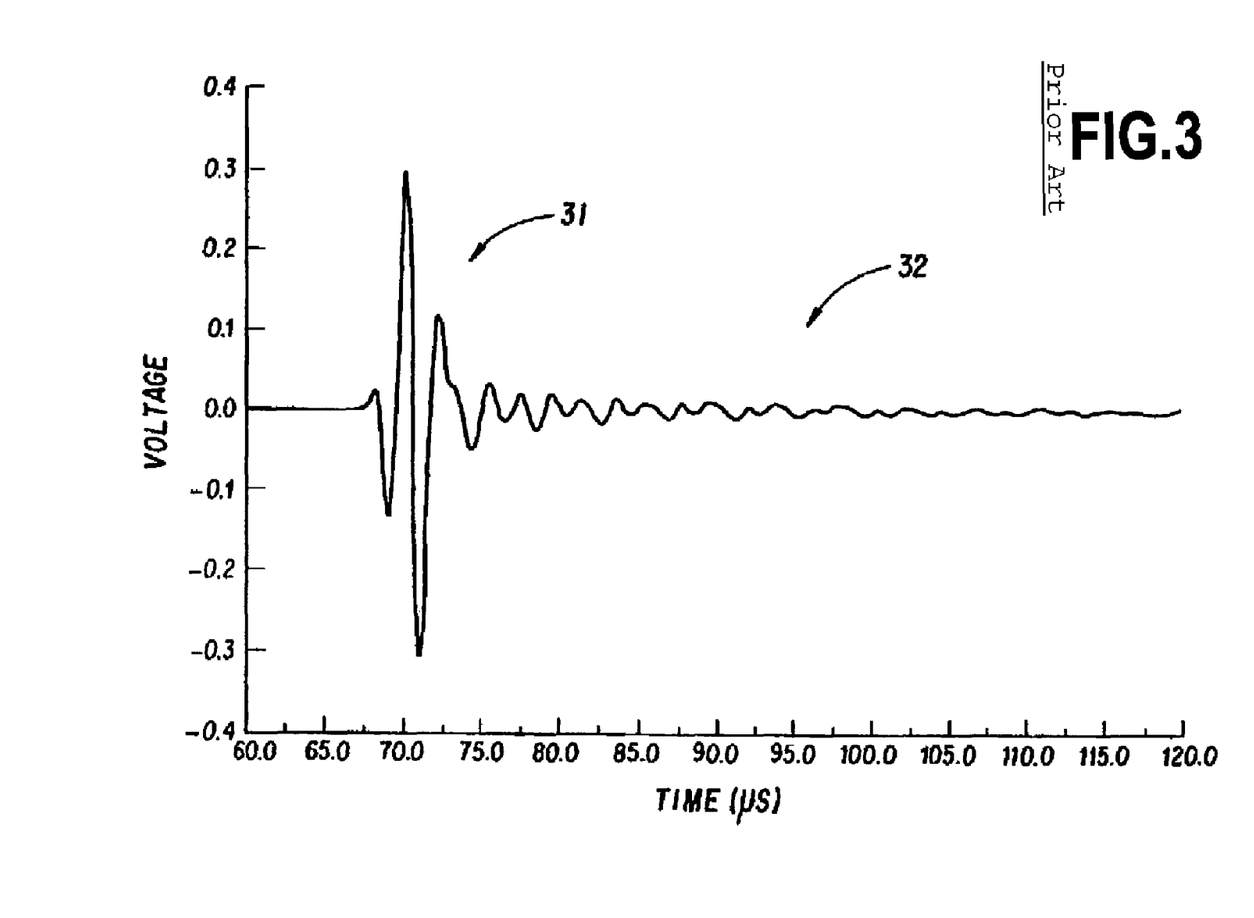
FIG. 3 shows an example of a measured waveform.

Turning now to FIG. 3, a typical return waveform from a casing excited by the acoustic pulse of FIG. 2 is illustrated. The return waveform, a typical response from a steel casing of approximately 17.8 cm in diameter, includes initial reflection segment 31 and reverberation segment 32. The initial reflection segment is due primarily to the reflection of the pulse from the inner surface of the casing. The magnitude of the initial reflection segment is a function of borehole fluid (e.g., composition of the mud), casing surface conditions, alignment of the sonde, as well as transceiver output.

The portion of the excitation pulse not immediately reflected enters the casing and excites the resonances in the casing, as discussed in detail above. Thus, the reverberation segment is due primarily to acoustical energy which was trapped in the casing, leaks back into the borehole fluid, and propagates back to the receiver. The relative amplitude and duration of the reverberation segment is a function of the amount of energy transferred from the casing to the formation via the cement therebetween. As is well known, the amount of transferred energy is a function of the characteristics of the cement seal coupling the casing and formation. Good cement quality would transfer more energy than would poor cement quality. Therefore, the casing resonances decay more rapidly for good cement quality than for poor cement quality. The waveform shown with reference to FIG. 3 has relatively rapid decay which is indicative of good cement quality. Lack of cement adhesion produces an error in the quantitative determination of impedance. However, the error in the apparent impedance due to lack of adhesion is small compared to the difference in impedance between typical good cement and that where cement is absent.

The return waveforms may be analyzed by data processor 18 of FIG. 1. U.S. Pat. No. 4,928,269 to Kimbal et al., published on 22 May 1990 discloses an example of a method for calculating the impedance of cement behind the section of a casing.

An impulse response $R_{cas}$ of the mud/casing/cement system results from reflection coefficients and transmission coefficients at each interface. The reflection coefficients and transmission coefficients at each interface are on turn function of acoustic impedances of the mud, casing and cement. Hence is becomes possible to invert the acoustic impedance of the cement from a known impulse response $R_{cas}$.

An actual transducer response W to a casing is a convolution $W = R_{cas} \otimes T$ of the impulse response $R_{cas}$ with a transmit/receive response T of the transducer, as would be recorded by reflection on a single interface with infinite impedance contrast.

Downhole, only W can be recorded and T is not know, since it is affected by mud impedance and attenuation, and also temperature and pressure which change characteristics of the transducer itself, such as the backing impedance. Hence it is necessary to approximate the transducer response T to obtain the impulse response $R_{cas}$ and invert the cement impedance.

Currently used processing methods for evaluating the impedance of the cement produce strongly biased results when determining the cement impedance.

SUMMARY OF INVENTION

The invention provides a method for estimating an impedance of a material behind a casing wall in a borehole. The method comprises exciting the casing wall with an acoustic pulse and measuring an experimental acoustic waveform reflected from the casing wall. An impedance parameter is initialized and an inverse casing response computed as a function of the impedance parameter. The method further comprises deconvoluting the experimental acoustic waveform with the inverse casing response to obtain a transducer response, and performing an iterative loop comprising the computing of an inverse casing response and the deconvoluting of the experimental acoustic waveform by varying the impedance parameter until the transducer response becomes compact in the time domain. The estimated impedance is obtained from the impedance parameter when the transducer response is compact.

In a first preferred embodiment, the method further comprises initializing a casing thickness parameter. The computing of the inverse casing response is performed as a function of the impedance parameter and the casing thickness parameter, the iterative loop is performed by varying the impedance parameter and the casing thickness parameter until the transducer response becomes compact in the time domain, and an estimated casing thickness is obtained from the casing thickness parameter when the transducer response is compact.

In a second preferred embodiment a determined energy of the transducer response is evaluated for a determined time window of the transducer response, wherein the determined time window is chosen to start at an instant occurring after a main impulse of the transducer response and wherein the transducer response becomes compact in the time domain when the determined energy is smaller than a predetermined energy threshold.

In a third preferred embodiment the measuring of the experimental acoustic waveform is performed during a measuring time window, and the computing of the inverse casing response is performed for a truncated casing response in order to correspond to the measuring time window.

In a fourth preferred embodiment the iterative loop comprises varying the impedance according to a Gauss Newton formula.

Other aspects and advantages of the invention will be apparent from the following description and the appended claims.

DETAILED DESCRIPTION

Prior Art Processing Method

Currently used processing methods to invert the cement impedance rely on a fit between a synthetically obtained waveform and a measured waveform.

Figure 4:
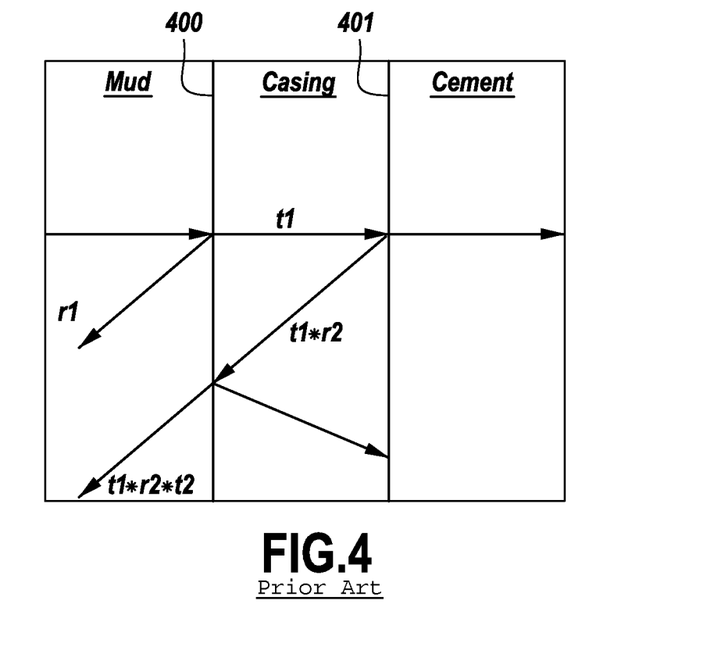
FIG. 4 shows optical properties of a mud/casing/cement system.

The impulse response $R_{cas}$ of the system mud/casing/cement is given by reflection coefficients $r_1$, $r_2$ and transmission coefficients $t_1$, $t_2$ at each interface. FIG. 4 illustrates a planar model of the interfaces comprising a mud/casing interface 400 and a casing/cement interface 401. The planar model constitutes an approximation of the real cylindrical casing since it assumes an infinite curvature of the casing. This may of course induce errors when computing $R_{cas}$ for the real casing.

The reflection coefficients $r_1$, $r_2$ and transmission coefficients $t_1$, $t_2$ are themselves function of acoustic impedance of mud Zmud, steel (casing) Zcas and cement Zcem. The functions are as follows $r_1 = \dfrac{Zcas - Zmud}{Zcas + Zmud}$ (reflection at mud/casing interface)

$r_2 = \dfrac{Zcem - Zcas}{Zcem + Zcas}$ (reflection at casing/cement interface)

$t_1 = \dfrac{2Zcas}{Zcas + Zmud}$ (transmission at mud/casing interface)

$t_2 = \dfrac{2Zmud}{Zcas + Zmud}$ (transmission at casing/mud interface)

Therefore we have following equation:

$t_1 t_2 = 1 - r_1^2$

Figure 5:
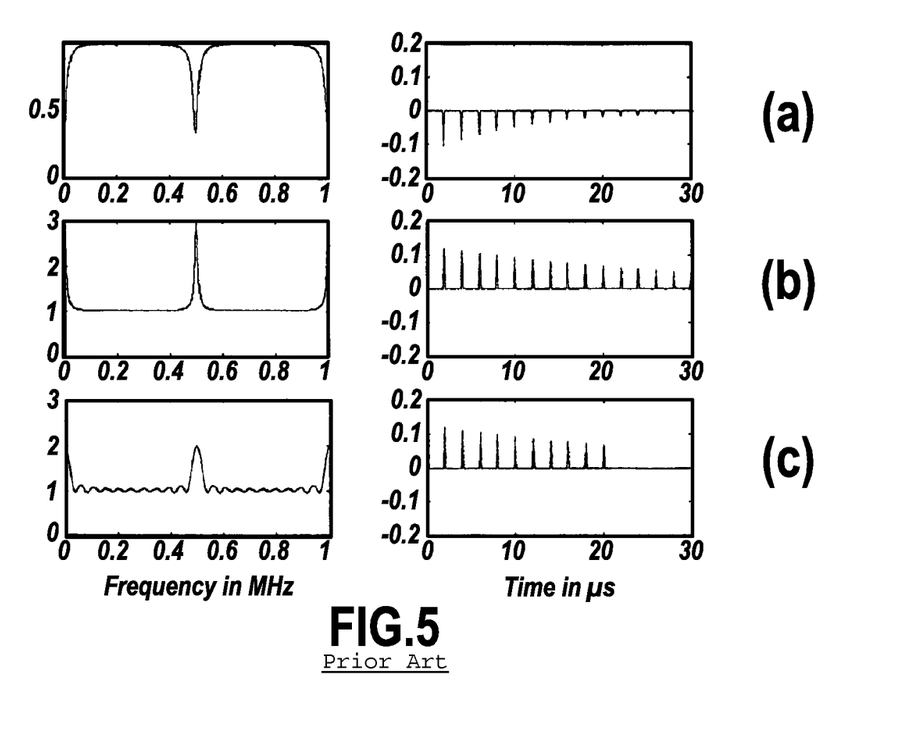
FIG. 5 illustrates typical casing responses in a planar model.

FIG. 5 shows an example of casing impulse response in frequency domain (left column) and in time (right column). In this example the thickness is 6 mm, the acoustic impedance of mud Zmud is 1.5 MRayls and the acoustic impedance of cement Zcem is 3.0 MRayls.

FIG. 5(a), i.e. the top graphs in FIG. 5 show the casing impulse response as a series of impulses at a time interval $\Delta t$ given by the round trip in the casing thickness. The value of the time interval in this example is $\Delta t = 2$ μs, but the value may range up to 4 μs for a 12 mm thick casing.

The amplitudes of the impulses are given by the following series of amplitudes $r_1$ $r_2(1-r_1^2)$ $r_2(1-r_1^2)(-r_1 r_2)$ $\ldots$ $r_2(1-r_1^2)(-r_1 r_2)^n$ the first value on the first line corresponding to the first peak, the last value on the last line corresponding to the n-th peak.

FIG. 5(b) shows the inverse casing impulse response, and FIG. 5(c) shows the truncated inverse casing response wherein impulses after 20 μs have been eliminated.

As was mentioned above, the actual transducer response to a casing is the convolution $W = R_{cas} \otimes T$ of the impulse response $R_{cas}$ with a transmit/receive response T of the transducer, as would be recorded by reflection on a single interface with infinite impedance contrast.

The currently used processing relies on a comparison of group delay width of the fundamental frequency between the experimental waveform (W) and a synthetic waveform. The synthetic waveform is obtained by convolution of the planar model casing response $R_{cas}$ with an approximation of the transducer response T.

The planar model casing response may be calculated as explained in the above paragraphs and using supposed values for acoustic impedances of mud Zmud, steel (casing) Zcas and cement Zcem.

The approximation of the transducer response T is a truncation of an early part of W, over a window of about ±6 μs with respect to the peak value of the waveform. The approximation undergoes at least the two effects as explained in the following. The first effect is that the approximation contains the early part of the casing response, independent from the casing thickness. The second effect is that the approximation differs from the transducer T because the true transducer response T may be longer than the truncation window, especially at high temperature, where the backing impedance decreases and the duration of T increase.

Figure 8:
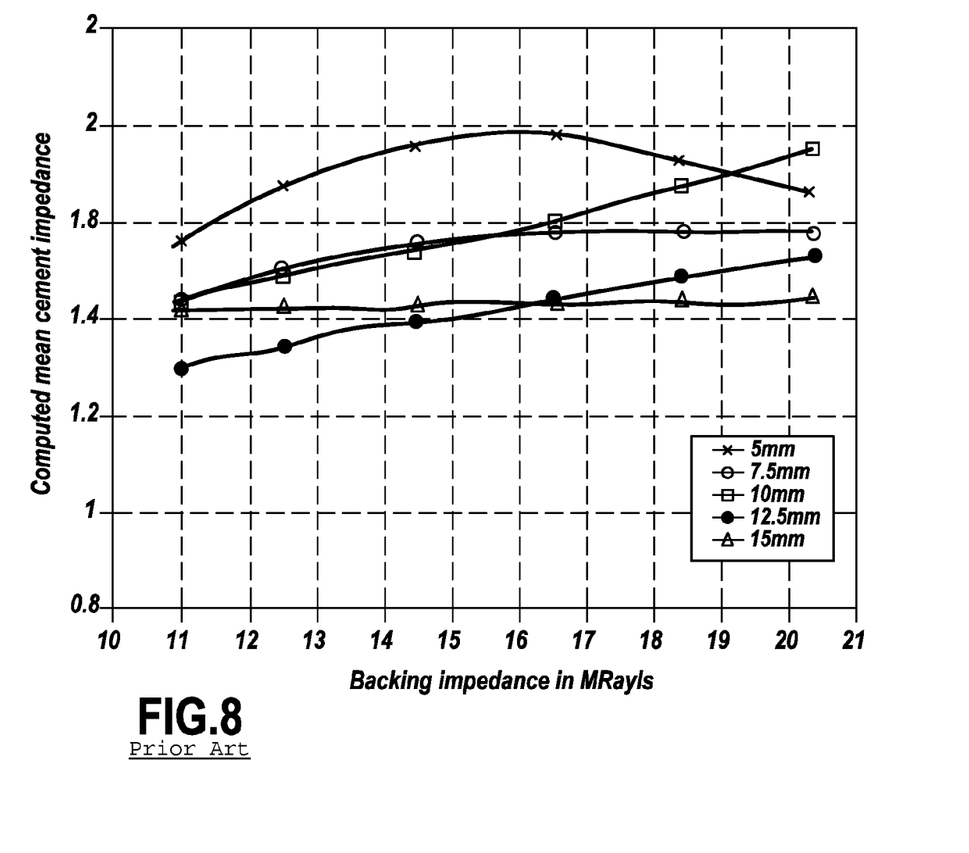
FIG. 8 shows cement impedance estimation results according to prior art.

Both effects in the approximation influence the synthetic waveform and may lead to a bias in the estimation of the cement impedance Zcem. FIG. 8 illustrates the effect of the backing impedance and the casing thickness on the estimated cement impedance Zcem when using the current processing method. The real values of the cement impedance and the mud impedance are each 1.5 MRayls. FIG. 8 shows that the bias may be in the order of 0.3 MRayls for a given casing thickness and over the presented backing impedance range, i.e. over the range from 11 to 20.5 MRayls.

Predictive Deconvolution

General Introduction

The invention provides a new processing scheme that improves the estimation of the cement impedance Zcem.

According to the invention, the processing scheme bases on an iterative process for estimating Zcem. A measured waveform W is deconvoluted by an inverse casing response $R_{cas}^{-1}$ in order to obtain an estimation of the transducer response T. The inverse casing response $R_{cas}^{-1}$ is obtained using an initial set of values of the cement impedance Zcem and casing thickness $Cas_{TSS}$. The calculated transducer response T is evaluated to check if it lies within a range of a determined threshold parameter. If the evaluated transducer response lies outside the range of the determined threshold parameter and depending on the result of the evaluation of the transducer response T, the cement impedance Zcem and casing thickness $Cas_{TSS}$ may be varied and the transducer response T recalculated in the iterative process until the evaluated transducer response T lies within the determined threshold. The last used values for the cement impedance Zcem and casing thickness $Cas_{TSS}$ are the estimated values inverted from the measured waveform using the inventive processing method.

The determined threshold parameter may be a criteria for convergence. The criteria for convergence on the cement impedance Zcem may be that the transducer response T should be compact in the time domain. This is in conformity with reality because the transducer is designed to give the shortest time response possible. A part of the energy in the transducer response outside of a determined window in the time domain may be considered to be caused by faulty parameter values in the calculated inverse casing response $R_{cas}^{-1}$.

Figure 6:
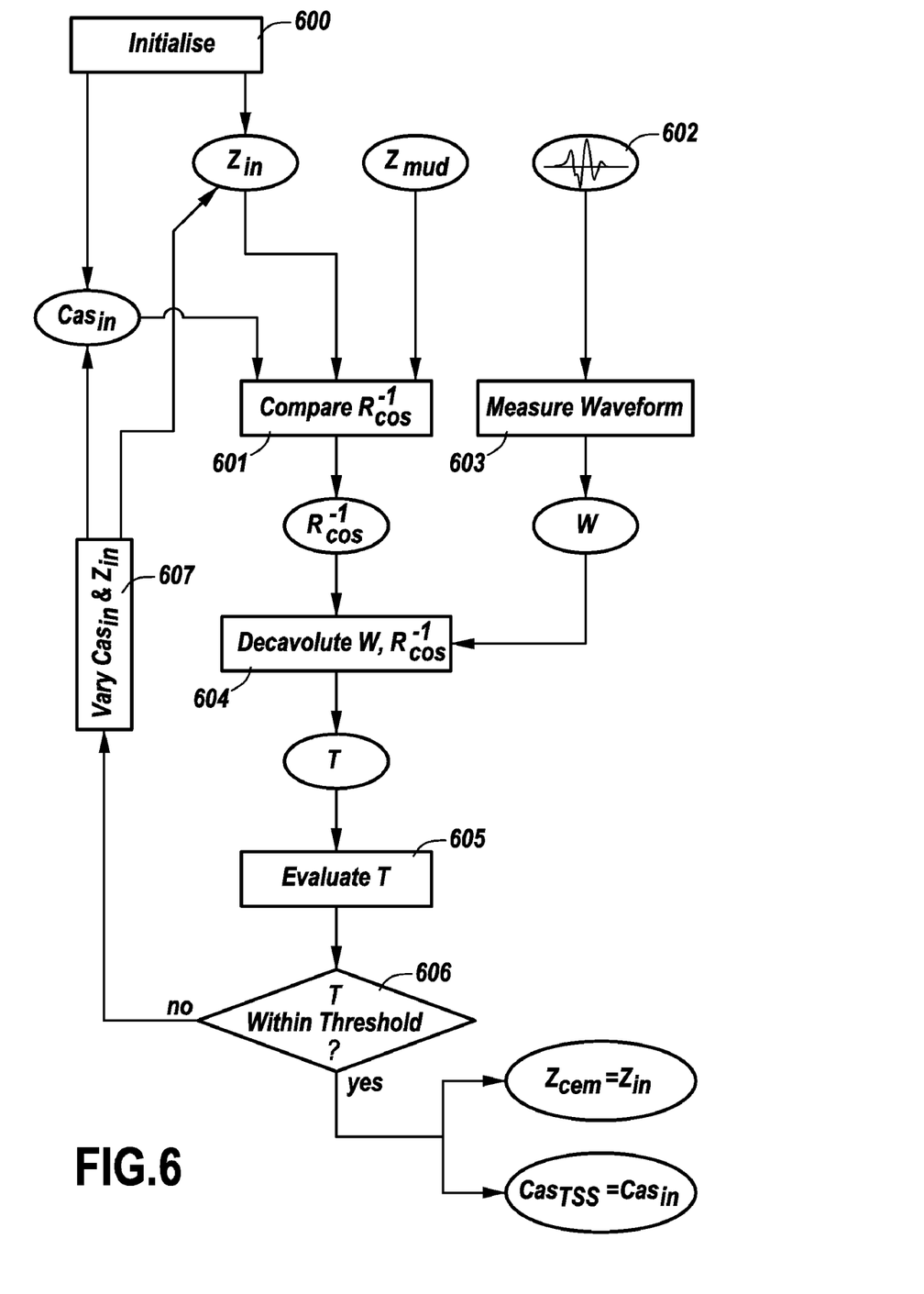
FIG. 6 shows a flowchart illustrating an example embodiment according to the invention.

FIG. 6 illustrates a generic example of the processing according to the invention. In the processing it is assumed that the value Zmud is known. Iteration parameters Zin and $Cas_{in}$ for the cement impedance and the casing thickness are given an initial value in an initialization step 600. The iteration parameters Zin and $Cas_{in}$, and the value of the mud impedance Zmud are used in a computing step 601 to obtain the inverse casing response $R_{cas}^{-1}$. Following an acoustic pulse excitation 602, a measurement 603 of the waveform W reflected from the casing (not shown in FIG. 6) is obtained. The measured waveform W is deconvoluted (604) with the computed inverse casing response $R_{cas}^{-1}$ to obtain the transducer response T. The transducer response T is evaluated in a step 605 and an iterative loop is initiated in step 606 wherein if the evaluated transducer response T lies outside a determined threshold range, the iteration parameters Zin and $Cas_{in}$ are varied in step 607 and the computing 601, the deconvoluting 604 and the evaluating 605 are repeated.

If in step 606 the evaluated transducer response appears to be within the determined threshold, than the iteration parameters Zin and $Cas_{in}$ are the result respectively of the estimated cement impedance Zcem and casing thickness $Cas_{TSS}$.

Computation of Inverse Casing Response

The inverse casing response $R_{cas}^{-1}$ may be computed according to any valid model, i.e., unlike the prior art processing method the invention is not restricted to using the planar model for the casing response computation.

According to a preferred embodiment the inverse casing response $R_{cas}^{-1}$ may be directly computed in the time domain by recursion. FIG. 5(b) shows an example of the inverse casing response $R_{cas}^{-1}$. The inverse casing response $R_{cas}^{-1}$ corresponds to a series of impulses separates by a same time interval Δt as in the (non-inverse) casing response $R_{cas}$. The amplitudes of the impulses are given by the following series of amplitudes $1/r_1$ $(1/r_1)(1-r_1^2)(-r_2/r_1)$ $(1/r_1)(1-r_1^2)(-r_2/r_1)^2$

...

$(1/r_1)(1-r_1^2)(-r_2/r_1)^n$ the first value on the first line corresponding to the first peak, the last value on the last line corresponding to the n-th peak. The series is positive, growing when $r_2$ is larger than $r_1$, decreasing if $r_2$ is smaller than $r_1$, and constant if $r_1$ and $r_2$ are equal.

The deconvolution of W with this series, in which $r_2$ would be given the true value of the cement impedance would lead to the true transducer response T.

However, in practical implementation, W has to be truncated in time, to avoid interference with formation reflection or multiply reflected echoes. As a consequence $R_{cas}^{-1}$ may also be truncated in time as is shown for example in FIG. 5(c). This does not affect the results. The truncation of $R_{cas}^{-1}$ has the further benefit that the poles of $R_{cas}^{-1}$, i.e., values of $R_{cas}^{-1}$ when Zcem=Zmud, disappear and deconvolution can be implemented in the frequency domain with advantages in computation time. The frequency domain filter may be written as follows:

$$\Re_{cas}^{-1}(\omega) = 1/r_1 + (1/r_1)(1-r_1^2)\sum_{k=1}^{N}(-r_2/r_1)^k \exp(-jk\Delta t\omega)$$

wherein N is the number of casing resonance periods in the truncation window.

$\Re_{cas}^{-1}$ is a function of the 3 unknown parameters the mud impedance Zmud, the cement impedance Zcem and the casing thickness $Cas_{TSS}$. As discussed for FIG. 6, the mud impedance is assumed to be known and only the cement impedance and the casing thickness are used as iterative parameters when computing the frequency domain filter and implementing the deconvolution with the measured waveform W.

Evaluation of the Transducer Response

As mentioned earlier in this description, the transducer response T may be evaluated on compactness in the time domain. If the transducer response is found to be compact in the time domain then the estimated values of the cement impedance and of the casing thickness may be considered to correspond to the real values.

Figure 7:
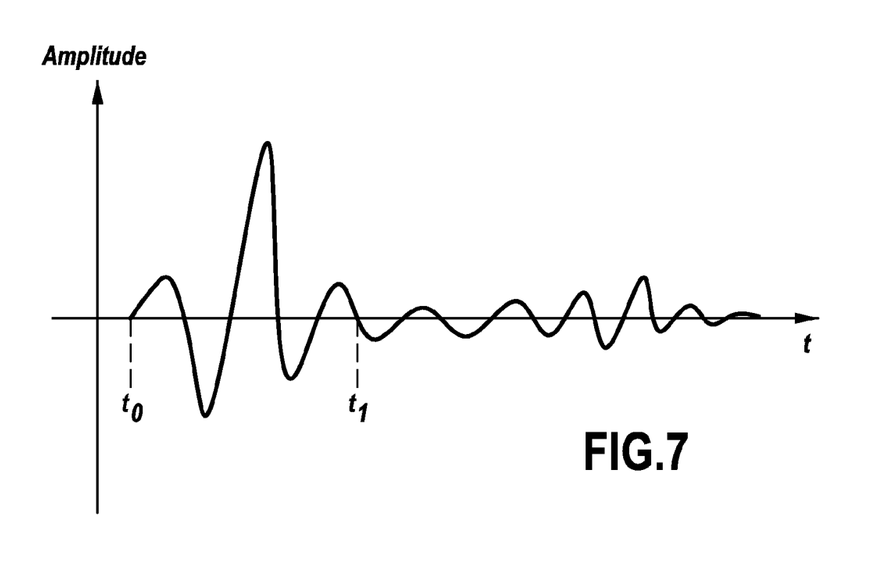
FIG. 7 shows an example of estimated transducer response.

FIG. 7 shows an example of a transducer response T having a main impulse between instants t0 and t1. The transducer response T has a duration Dimp=t1−t0. Therefore a main impulse, i.e. a main part of the energy of the transducer response may be found in a time window Dimp starting at the instant t0, i.e. between instants t0 and t1. All energy ε of the transducer response for t>t1 may be considered to be caused by faulty parameter values in the calculated inverse casing response $R_{cas}^{-1}$. The energy ε of the transducer response may be obtained as follows:

$$\varepsilon = \sqrt{\int_{t>t1} T_t^2}$$

In order to evaluate the compactness of the transducer response T, a determined threshold parameter $\epsilon_0$ is selected. The threshold parameter $\epsilon_0$ is a criteria of convergence for the transducer response, meaning that the cement impedance Zcem and the casing thickness $Cas_{TSS}$ must be selected to obtain a transducer response T for which the energy ε is smaller than the threshold parameter $\epsilon_0$, i.e., T is compact when $\epsilon < \epsilon_0$.

Returning to FIG. 6 the compactness of the transducer response is evaluated in steps 605 and 606. If for the used values Zin and $Cas_{in}$, of the cement impedance and the casing thickness, the transducer response is not found to be compact, then Zin and $Cas_{in}$, are varied in the iterative loop to obtain a new transducer response T until the transducer response T becomes compact. The varying of Zin and $Cas_{in}$ in the iterative loop may be performed for example by applying a Gauss Newton formula as is well known is the art, e.g. in *Numerical Methods for Unconstrained optimization and Nonlinear Equations*, J. E. Denis, Jr, Robert B. Schnabel, Society for Industrial and Applied Mathematics, Philadelphia, p. 221-222.

Estimated Cement Impedance

Figure 9:
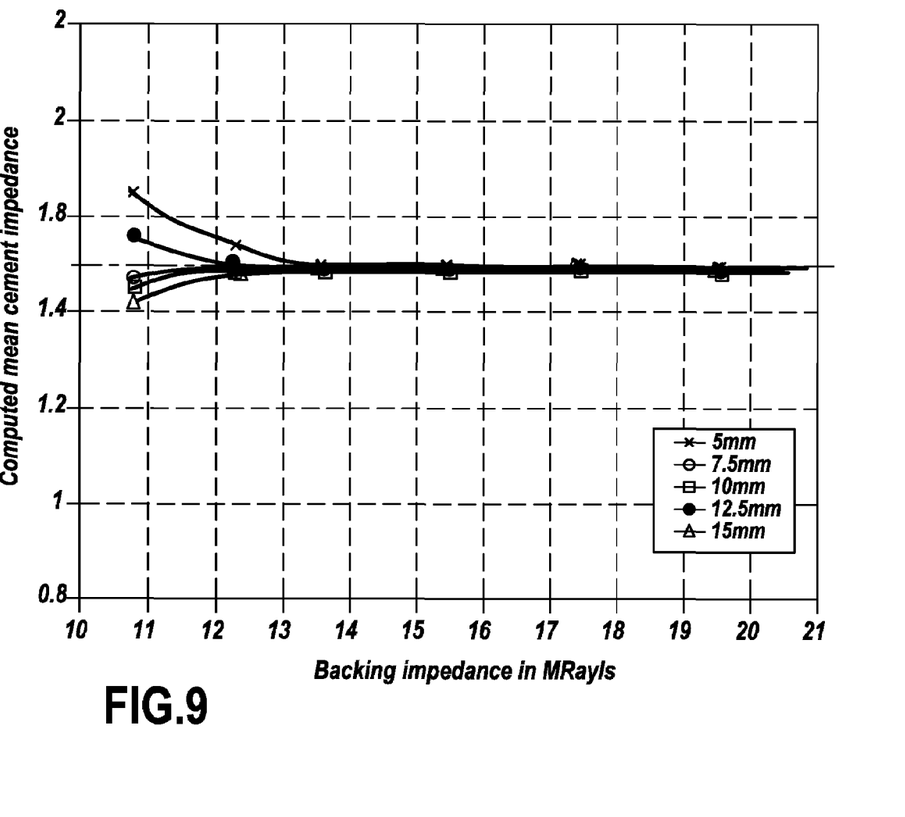
FIG. 9 shows examples of cement impedance estimation results according to the invention.

FIG. 9 illustrates the effect of the backing impedance and the casing thickness on the estimated cement impedance Zcem when using the inventive processing method. The conditions of measurement are similar to those in FIG. 8, i.e., the real values of the cement impedance and the mud impedance are each 1.5 MRayls. The casing thickness in this example is also assumed to be know, i.e., only the cement impedance is varied in the search for a compact transducer response. The energy time window (not shown in FIG. 9) is chosen to start 10 μs after the main echo peak (t0) and ends 10 periods of the resonance frequency after the main echo peak (t1).

FIG. 8 shows that the bias is negligible for all casing thicknesses when the backing impedance is larger than 14 MRayls. Below this value, the transducer response T starts to become longer than 10 μs and energy creeping into the measurement window leads to a small bias. Increasing the 10 μs value would decrease the bias, at the expense of noise, due to a shorter window length.

The invention provides an improved process for estimating the cement impedance of cement located behind a casing of a borehole. As compared to prior art, the invention does not require to estimate the transducer response T, and thus avoids the error sources inherent to the estimating of the transducer response.

The invention allows to use any model to compute the inverse casing response. This again improves the accuracy achieved with the invention as compared to prior art where only the planar model may be used to compute the casing response.

The invention enables the use of a full spectrum of the inverse casing response. This overcomes a limitation of prior art, where only a part of the casing response is used in the evaluation of the group delay width around the fundamental frequency, and thus limitations for thick casings occur.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for estimating an impedance of a material behind a casing wall in a borehole, the method comprising the steps of:
    exciting the casing wall with an acoustic pulse,
    measuring by means of a transducer an experimental acoustic waveform (W) reflected from the casing wall,
    initializing an impedance parameter (Zin),
    computing an inverse casing response ($R_{cas}^{-1}$) as a function of the impedance parameter (Zin) and a casing thickness parameter ($Cas_{in}$),
    deconvoluting the experimental acoustic waveform with the inverse casing response to obtain a transducer response (T),
    performing an iterative loop comprising the computing of an inverse casing response and the deconvoluting of the experimental acoustic waveform by varying the impedance parameter until the transducer response becomes compact in the time domain, and
    obtaining the estimated impedance (Zcem) from the impedance parameter when the transducer response is compact.

2. The method of claim 1, further comprising the step of:
    initializing the casing thickness parameter ($Cas_{in}$), wherein, the iterative loop is performed by varying the impedance parameter and the casing thickness parameter until the transducer response becomes compact in the time domain, and an estimated casing thickness is obtained from the casing thickness parameter when the transducer response is compact.

3. The method according to claim 1, wherein a determined energy of the transducer response is evaluated for a determined time window of the transducer response (t>t1), wherein the determined time window is chosen to start at an instant occurring after a main impulse of the transducer response and wherein the transducer response becomes compact in the time domain when the determined energy (ε) is smaller than a predetermined energy threshold ($\epsilon_0$).

4. The method according to claim 1, wherein the measuring of the experimental acoustic waveform is performed during a measuring time window, and wherein the computing of the inverse casing response is performed for a truncated casing response in order to correspond to the measuring time window.

5. The method according to claim 1, wherein the iterative loop comprises varying the impedance according to a Gauss Newton formula.

* * * * *